(12) United States Patent
Di et al.

(10) Patent No.: US 11,231,093 B2
(45) Date of Patent: Jan. 25, 2022

(54) GEAR TRAIN SIDE LATCHING MECHANISM FOR MODULAR INFORMATION HANDLING RESOURCE

(71) Applicant: Dell Products L.P., Round Rock, TX (US)

(72) Inventors: Harris Di, Shanghai (CN); Qingqiang Guo, Shanghai (CN); Chen Zhao, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 33 days.

(21) Appl. No.: 16/924,548

(22) Filed: Jul. 9, 2020

(65) Prior Publication Data

US 2021/0404541 A1    Dec. 30, 2021

(30) Foreign Application Priority Data

Jun. 29, 2020    (CN) .......................... 202010608019.X (51) Int. Cl.
*F16H 19/04*    (2006.01)
*G06F 13/40*    (2006.01)
(Continued)

(52) U.S. Cl.
CPC ............... *F16H 19/04* (2013.01); *E05C 3/12* (2013.01); *F16H 19/001* (2013.01); *G06F 13/409* (2013.01); *G06F 13/4068* (2013.01)

(58) Field of Classification Search
CPC .......... F16H 19/04; F16H 19/001; E05C 3/12; G06F 13/4068; G06F 13/409
See application file for complete search history.

(56) References Cited

U.S. PATENT DOCUMENTS

8,388,361 B2 * 3/2013 Wavra ................... G06F 13/409
439/131
9,751,175 B2 * 9/2017 Feyrer .................... B23Q 1/621
(Continued)

*Primary Examiner* — David M Fenstermacher
(74) *Attorney, Agent, or Firm* — Jackson Walker L.L.P.

(57) ABSTRACT

A gear train side latching mechanism may include a bracket having one or more guiding features, a handle mechanically coupled to the bracket via the one or more guiding features such that the handle is linearly movable with respect to the bracket, a rack mechanically coupled to the handle comprising a first plurality of gear teeth and configured to move linearly relative to the bracket in a fixed relation to the handle, a driving gear rotatably coupled to the bracket and comprising a compound circular spur gear having a second plurality of gear teeth on an outer diameter of the driving gear and a third plurality of gear teeth on an inner diameter of the driving gear, wherein the second plurality of gear teeth are mechanically coupled to the first plurality of gear teeth, and an actuator gear rotatably coupled to the bracket and comprising a fourth plurality of gear teeth mechanically coupled to the third plurality of gear teeth and further comprising one or more features configured to engage with a corresponding engagement feature of a mechanical member. The gear train side latching mechanism may be arranged such that linear motion of the handle relative to the bracket transmits mechanical energy to the actuator gear via the rack and the driving gear to cause the actuator gear to mechanically interact with the engagement feature to transmit mechanical energy to the engagement feature.

15 Claims, 7 Drawing Sheets

(51) Int. Cl.
 *E05C 3/12* (2006.01)
 *F16H 19/00* (2006.01)

(56) References Cited

U.S. PATENT DOCUMENTS

| | | | | |
|---|---|---|---|---|
| 9,982,937 | B2 * | 5/2018 | Tierney | F25D 25/025 |
| 10,344,914 | B2 * | 7/2019 | Cardozo | F16M 11/2085 |
| 10,384,707 | B2 * | 8/2019 | Chen | B25J 9/102 |
| 10,413,064 | B1 * | 9/2019 | Lu | A47B 88/50 |
| 10,609,835 | B1 * | 3/2020 | Liu | H05K 7/1487 |
| 10,626,990 | B2 * | 4/2020 | Gausrab | B60T 1/005 |
| 10,785,353 | B1 * | 9/2020 | Li | G06F 1/1686 |
| 10,912,696 | B2 * | 2/2021 | Staudinger | A61G 13/02 |
| 10,968,678 | B2 * | 4/2021 | Hall | E05F 15/635 |
| 11,044,825 | B1 * | 6/2021 | Han | H05K 5/0017 |
| 11,047,168 | B2 * | 6/2021 | Hsu | E06B 7/084 |
| 11,051,413 | B2 * | 6/2021 | Yang | H05K 5/0017 |
| 11,124,107 | B2 * | 9/2021 | Revelino | B60P 3/34 |

* cited by examiner

GEAR TRAIN SIDE LATCHING MECHANISM FOR MODULAR INFORMATION HANDLING RESOURCE

TECHNICAL FIELD

The present disclosure relates to modular information handling systems. More specifically, embodiments of the disclosure provide systems and methods for a gear train side latching mechanism for a modular information handling resource.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Oftentimes, information handling systems and other information handling resources (e.g., storage devices, input/output devices, and other peripheral devices) are each manufactured in a modular form factor and may be configured to be disposed in a chassis configured to receive such modular components. Such a chassis and its component modular information handling systems and information handling resources typically include various rails, carriers, and other mechanical components allowing for a person to add and remove the modular information handling systems and information handling resources from the chassis. In traditional modular systems, information handling resources (including hard disk drives) and their corresponding chassis bays are typically accessed from a side of the chassis in which the information handling resources may be added or removed.

It is desirable in most instances to provide users (e.g., information technology technicians or administrators) a convenient way to insert and remove information handling resources from a chassis. For instance, when a user desires to remove an information handling resource from a chassis, a mating force between electrical connectors on the information handling resource and within the chassis, along with other mechanical forces (e.g., friction between the chassis and the information handling resource) must be overcome for removal. However, due to height and size restrictions of many information handling resources and associated chassis slots, it is often difficult to provide sufficient mechanical advantage for easy removal.

SUMMARY

In accordance with the teachings of the present disclosure, the disadvantages and problems associated with traditional approaches to insertion and removal of modular information handling resources in a chassis have been substantially reduced or eliminated.

In accordance with embodiments of the present disclosure, a gear train side latching mechanism may include a bracket having one or more guiding features, a handle mechanically coupled to the bracket via the one or more guiding features such that the handle is linearly movable with respect to the bracket, a rack mechanically coupled to the handle comprising a first plurality of gear teeth and configured to move linearly relative to the bracket in a fixed relation to the handle, a driving gear rotatably coupled to the bracket and comprising a compound circular spur gear having a second plurality of gear teeth on an outer diameter of the driving gear and a third plurality of gear teeth on an inner diameter of the driving gear, wherein the second plurality of gear teeth are mechanically coupled to the first plurality of gear teeth, and an actuator gear rotatably coupled to the bracket and comprising a fourth plurality of gear teeth mechanically coupled to the third plurality of gear teeth and further comprising one or more features configured to engage with a corresponding engagement feature of a mechanical member. The gear train side latching mechanism may be arranged such that linear motion of the handle relative to the bracket transmits mechanical energy to the actuator gear via the rack and the driving gear to cause the actuator gear to mechanically interact with the engagement feature to transmit mechanical energy to the engagement feature.

In accordance with these and other embodiments of the present disclosure, an information handling system may include a chassis comprising a bay for receiving a mechanical member and a gear train side latching mechanism mechanically coupled to a wall of the bay. The gear train side latching mechanism may include a bracket having one or more guiding features, a handle mechanically coupled to the bracket via the one or more guiding features such that the handle is linearly movable with respect to the bracket, a rack mechanically coupled to the handle comprising a first plurality of gear teeth and configured to move linearly relative to the bracket in a fixed relation to the handle, a driving gear rotatably coupled to the bracket and comprising a compound circular spur gear having a second plurality of gear teeth on an outer diameter of the driving gear and a third plurality of gear teeth on an inner diameter of the driving gear, wherein the second plurality of gear teeth are mechanically coupled to the first plurality of gear teeth, and an actuator gear rotatably coupled to the bracket and comprising a fourth plurality of gear teeth mechanically coupled to the third plurality of gear teeth and further comprising one or more features configured to engage with a corresponding engagement feature of a mechanical member. The gear train side latching mechanism may be arranged such that linear motion of the handle relative to the bracket transmits mechanical energy to the actuator gear via the rack and the driving gear to cause the actuator gear to mechanically interact with the engagement feature to transmit mechanical energy to the engagement feature.

In accordance with these and other embodiments of the present disclosure, a chassis bay for receiving a mechanical member may include a plurality of walls and a gear train side latching mechanism mechanically coupled to a wall of the plurality of walls. The gear train side latching mechanism may include a bracket having one or more guiding features, a handle mechanically coupled to the bracket via the one or more guiding features such that the handle is linearly movable with respect to the bracket, a rack mechanically coupled to the handle comprising a first plurality of gear teeth and configured to move linearly relative to the bracket in a fixed relation to the handle, a driving gear rotatably coupled to the bracket and comprising a compound circular spur gear having a second plurality of gear teeth on an outer diameter of the driving gear and a third plurality of gear teeth on an inner diameter of the driving gear, wherein the second plurality of gear teeth are mechanically coupled to the first plurality of gear teeth, and an actuator gear rotatably coupled to the bracket and comprising a fourth plurality of gear teeth mechanically coupled to the third plurality of gear teeth and further comprising one or more features configured to engage with a corresponding engagement feature of a mechanical member. The gear train side latching mechanism may be arranged such that linear motion of the handle relative to the bracket transmits mechanical energy to the actuator gear via the rack and the driving gear to cause the actuator gear to mechanically interact with the engagement feature to transmit mechanical energy to the engagement feature.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 6C, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

In this disclosure, the term "information handling resource" may broadly refer to any component system, device or apparatus of an information handling system, including without limitation processors, buses, memories, input-output devices and/or interfaces, storage resources, network interfaces, motherboards, electro-mechanical devices (e.g., fans), displays, and power supplies.

Figure 1:
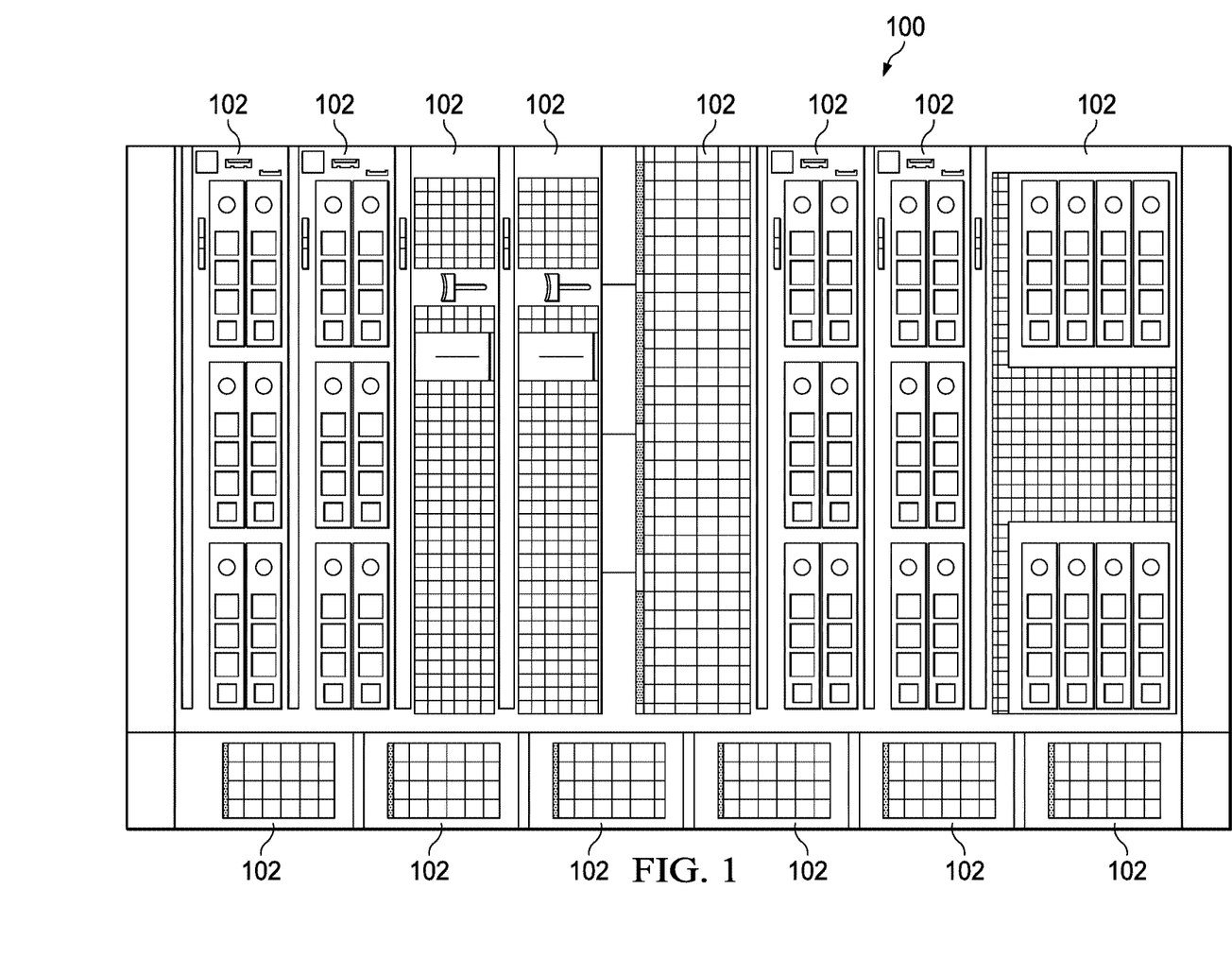
FIG. 1 illustrates a front view of an example chassis for receiving modular information handling resources, in accordance with embodiments of the present disclosure.

FIG. 1 illustrates a front view of an example chassis 100 for receiving modular information handling resources, in accordance with embodiments of the present disclosure. Chassis 100 may be an enclosure that serves as a container for various information handling systems and information handling resources, and may be constructed from steel, aluminum, plastic, and/or any other suitable material. Although the term "chassis" is used, chassis 100 may also be referred to as a case, cabinet, tower, box, enclosure, and/or housing. In certain embodiments, chassis 100 may be configured to hold and/or provide power to a plurality of information handling systems and/or information handling resources. As depicted in FIG. 1, chassis 100 may include one or more bays for receiving information handling resources 102, as described in greater detail below.

Figure 2:
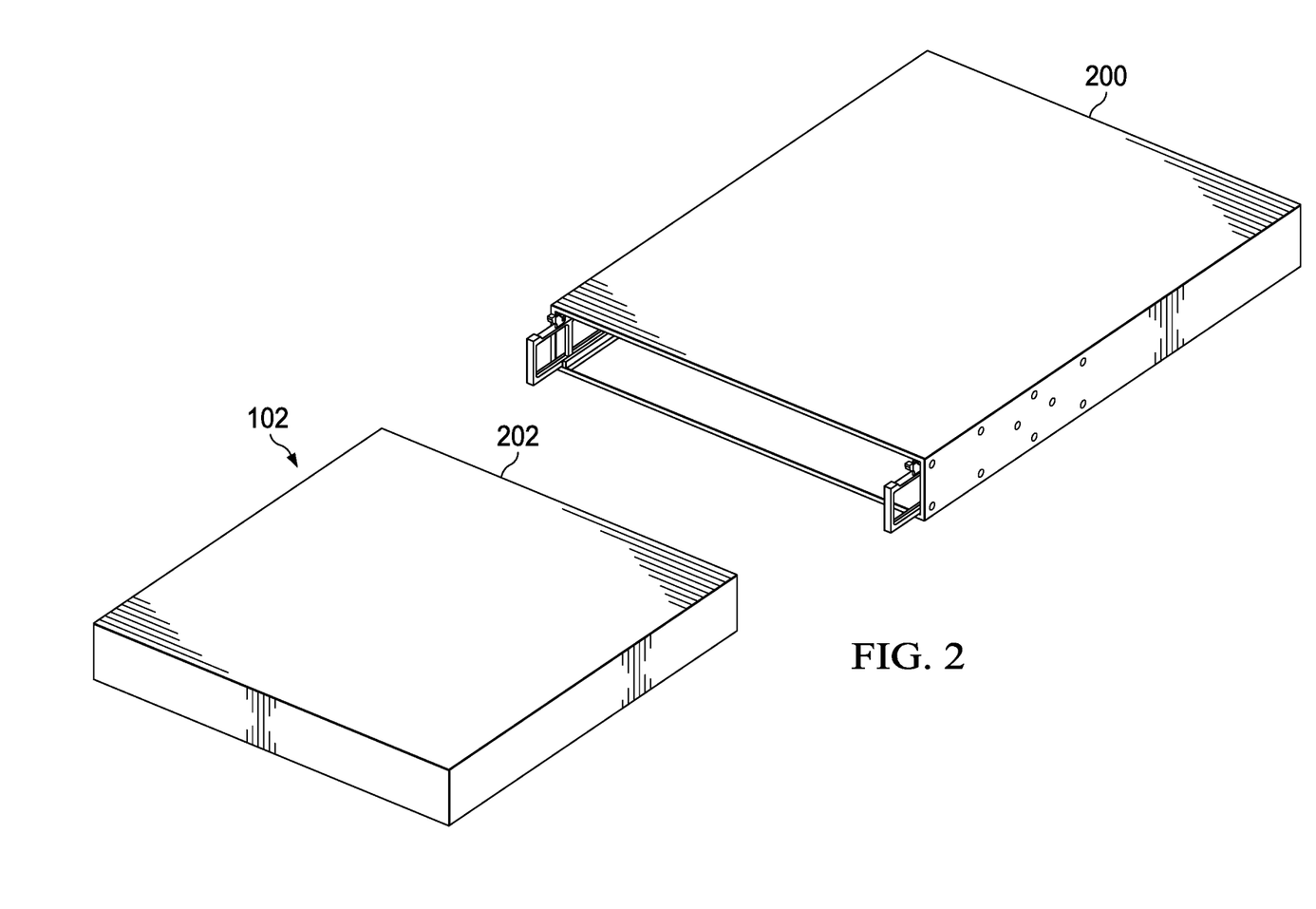
FIG. 2 illustrates a perspective view of an example empty chassis bay of the chassis shown in FIG. 1 and an information handling resource that may be inserted into the chassis bay, in accordance with embodiments of the present disclosure.

FIG. 2 illustrates a perspective view of an example empty chassis bay 200 of chassis 100 shown in FIG. 1 and an information handling resource 102 that may be inserted into chassis bay 200, in accordance with embodiments of the present disclosure. As shown in FIG. 2, information handling resource 102 may comprise on at least one side thereof, an engagement feature 202 configured to engage with an actuator gear of a gear train side latching mechanism, as described in greater detail below. Although not shown in FIG. 2, information handling resource 102 may include another engagement feature 202 on an opposite side of information handling resource 102 from the side of information handling resource 102 shown to include engagement feature 202. Although FIG. 2 depicts engagement feature 202 as being cylindrical in shape, engagement feature 202 may be of any suitable size and/or shape.

Figure 3:
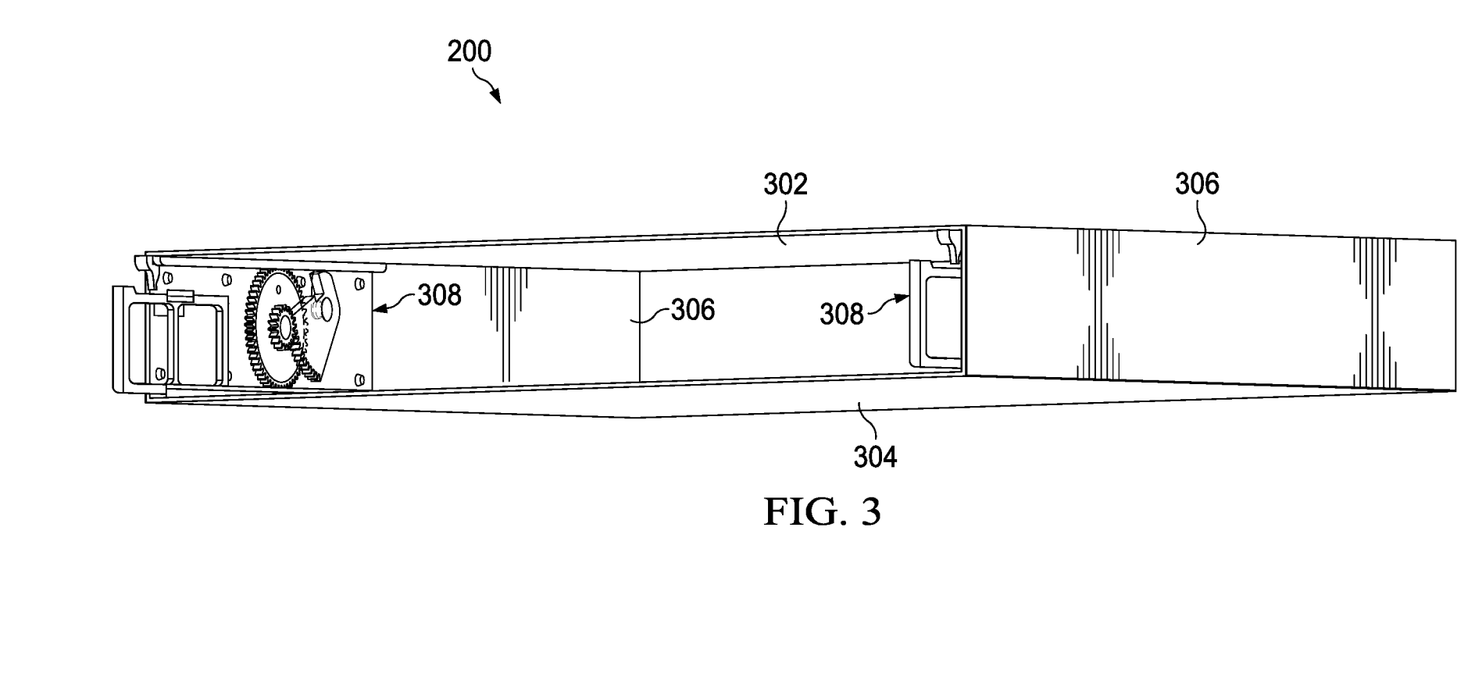
FIG. 3 illustrates a detailed perspective view of a front of the empty chassis bay depicted in FIG. 2, in accordance with embodiments of the present disclosure.

FIG. 3 illustrates a detailed perspective view of a front of empty chassis bay 200, in accordance with embodiments of the present disclosure. As shown in FIG. 3, chassis bay 200 may include a ceiling 302, a floor 304 opposite ceiling 302, and two opposite side walls 306 generally perpendicular to ceiling 302 and floor 304. As also shown in FIG. 3, chassis bay 200 may comprise at least one gear train side latching mechanism 308 mechanically coupled to a side wall 306. In some embodiments, such as those embodiments represented by FIG. 3, both side walls 306 may have a respective gear train side latching mechanism mechanically coupled thereto.

Figure 4:
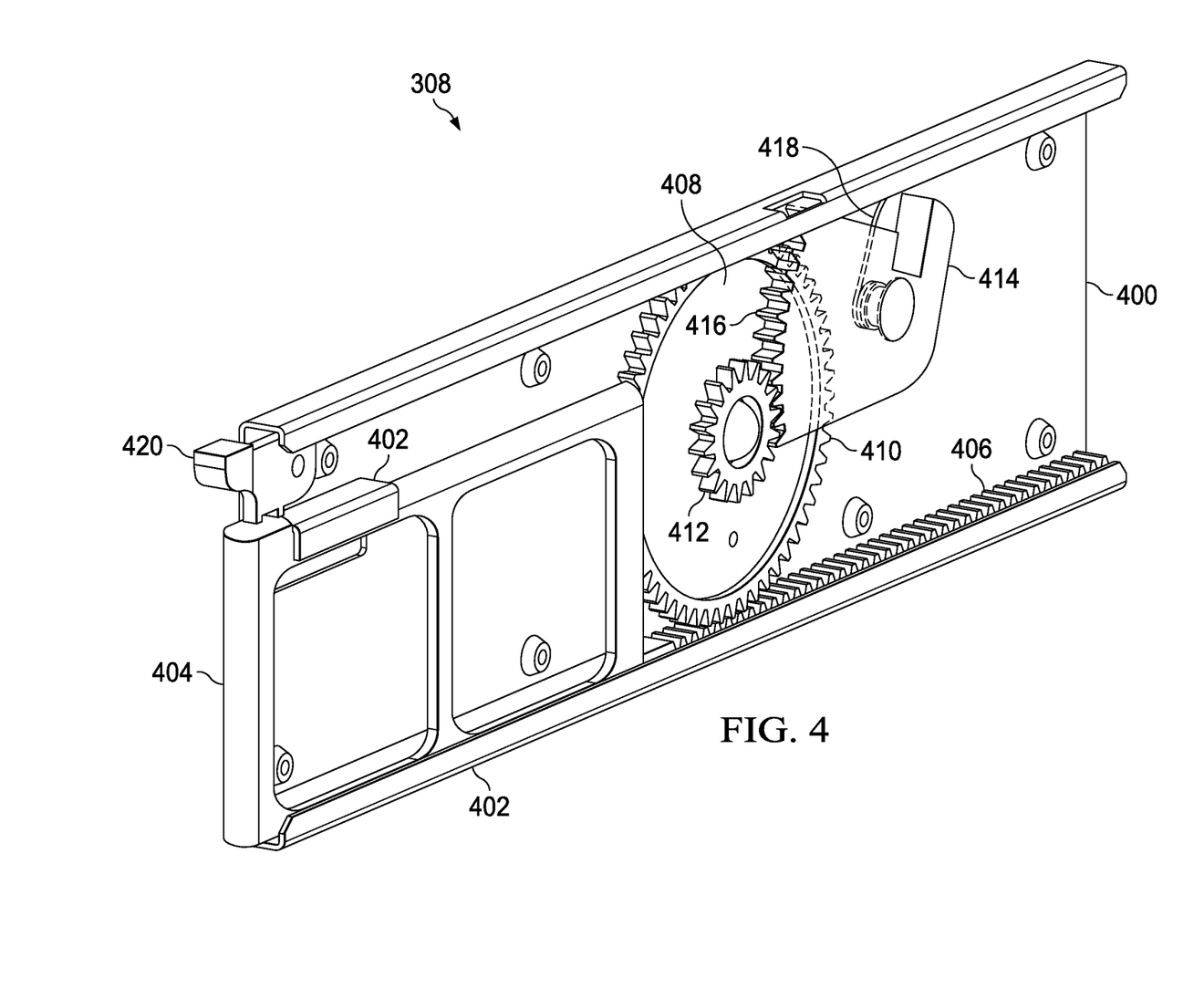
FIG. 4 illustrates a detailed perspective view of an example gear train side latching mechanism, in accordance with embodiments of the present disclosure.

FIG. 4 illustrates a detailed perspective view of example gear train side latching mechanism 308, in accordance with embodiments of the present disclosure. As shown in FIG. 4, gear train side latching mechanism 308 may include a bracket 400, guide features 402 mechanically coupled to and/or formed within bracket 400, handle 404 slidably coupled to bracket 400 via guide features 402, a rack 406 mechanically fixed to handle 404, a driving gear 408 rotatably coupled to bracket 400, an actuator gear 414 rotatably coupled to bracket 400, a torsion spring 418 mechanically coupled between bracket 400 and actuator gear 414, and a latch 420 rotatably coupled to bracket 400.

Bracket 400 may comprise a generally planar surface generally parallel with a side wall 306 of chassis bay 200 which may be coupled to side wall 306 with mechanical fasteners (e.g., screws) and/or which may be formed as a portion of side wall 306. As shown in FIG. 4, guide features 402 may be mechanically coupled to and/or formed within bracket 400, and may serve to mechanically guide handle 404 relative to bracket 400, as described in greater detail below.

Handle 404 may be slidably coupled to bracket 400 via guide features 402, such that motion of handle 404 may be fixed in a linear axis relative to bracket 400. Rack 406 may be mechanically coupled to, or formed as a part of handle 404, and may include a plurality of gear teeth arranged linearly as shown in FIG. 4.

Driving gear 408 may comprise a compound circular spur gear have a first plurality of gear teeth 410 on an outer diameter of driving gear 408 and a second plurality of gear teeth 412 on an inner diameter of driving gear 408, as shown in FIG. 4. As also shown in FIG. 4, first plurality of gear teeth 410 may mechanically engaged with gear teeth of rack 406, such that linear motion of rack 406 relative to bracket 400 may cause circular rotational motion of driving gear 408 about an axis of rotation relative to bracket 400.

Actuator gear 414 may comprise a portion of a circular gear and may include a plurality of gear teeth 416 mechanically engaged with the second plurality of gear teeth 412 on the inner diameter of driving gear 408, as shown in FIG. 4, such that rotational motion of driving gear 408 relative to bracket 400 causes opposite rotational motion of actuator gear 414 relative to bracket 400 (e.g., clockwise rotational motion of driving gear 408 relative to bracket 400 causes counterclockwise rotational motion of actuator gear 414 relative to bracket 400, and vice versa).

Torsion spring 418 may comprise any suitable system, device, or apparatus mechanically coupled between actuator gear 414 and bracket 400 so as to generate a mechanical spring force to bias actuator gear 414 in a particular position relative to bracket 400 in the absence of a mechanical force overcoming the spring force of torsion spring 418.

Latch 420 may be rotatably coupled to bracket 400 and may include one or more engagement features configured to mechanically engage with one or more corresponding engagement features of handle 404, to maintain handle 404 in a particular position relative to bracket 400 when handle 404 is inserted into bracket 400, as described in greater detail below. Although not shown in FIG. 4, latch 420 may be coupled to bracket 400 to bias latch 420 in a closed position relative to bracket 400.

Figure 5A:
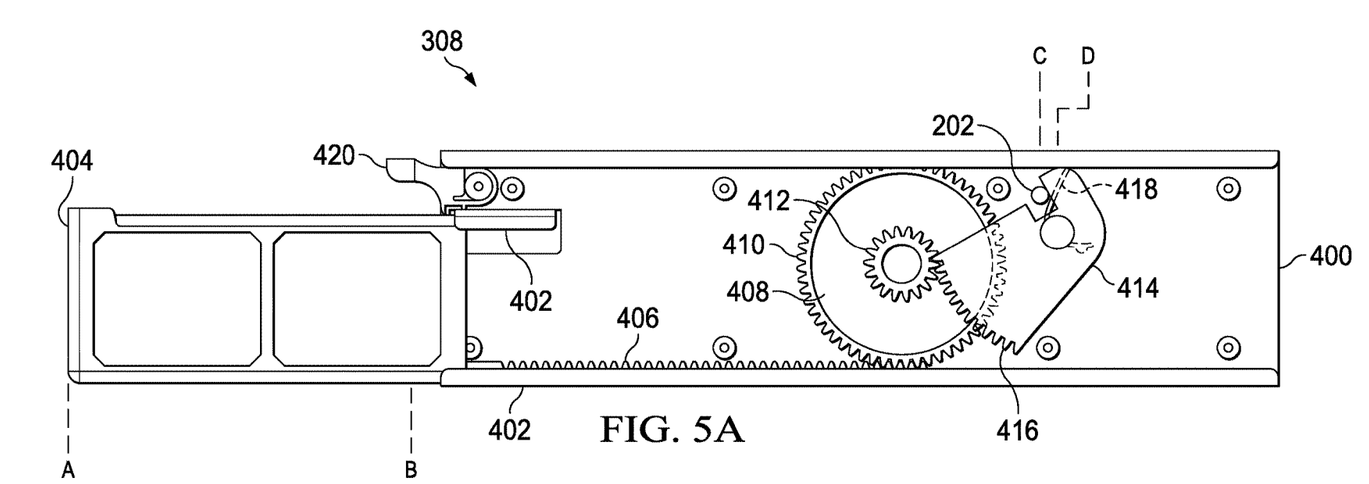
FIGS. 5A and 5B (which may be collectively referred to herein as FIG. 5) illustrate a side elevation view of the example gear train side latching mechanism demonstrating functionality of the example gear train side latching mechanism for insertion of an information handling resource into a chassis bay, in accordance with embodiments of the present disclosure.
Figure 5B:
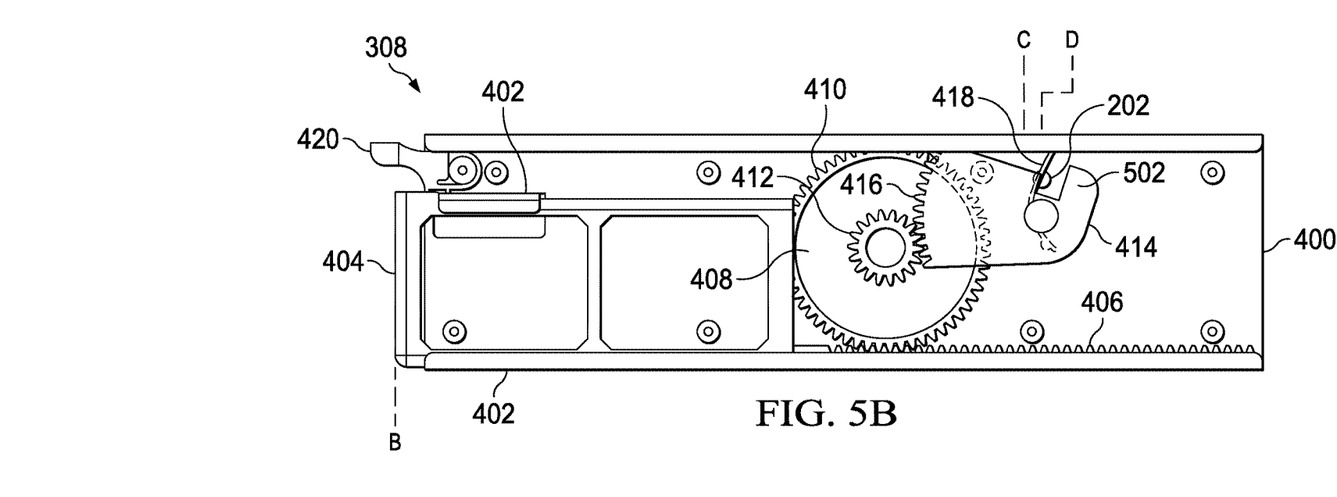

FIGS. 5A and 5B illustrate a side elevation view of example gear train side latching mechanism 308 demonstrating functionality of example gear train side latching mechanism 308 during insertion of an information handling resource 102 into a chassis bay 200 comprising gear train side latching mechanism 308, in accordance with embodiments of the present disclosure.

In an open position, shown in FIG. 5A, an information handling resource 102 may already be inserted within a chassis bay 200 comprising gear train side latching mechanism 308, as indicated by the cross-section of engagement feature 202 shown proximate to actuator gear 414. As shown in FIG. 5A, in this open position, the left-most portion of handle 404 may be at a position A relative to bracket 400 while engagement feature 202 may be at a position C relative to bracket 400.

While information handling resource 102 may already be inserted within a chassis bay 200 in the open position, such information handling resource 102 may not be fully inserted within chassis bay 200 such that connectors of information handling resource 102 electrically couple to corresponding connectors within chassis 100. To enable such full insertion, a user may apply a mechanical force to handle 404 to cause handle 404 to move linearly relative to bracket 400 from position A to position B (as shown in FIG. 5B), which in turn may cause similar linear motion of rack 406 relative to bracket 400.

Due to the engagement of gear teeth of rack 406 to the first plurality of gear teeth 410 of driving gear 408, linear motion of rack 406 relative to bracket 400 may cause rotational motion (e.g., counterclockwise in FIG. 5) of driving gear 408 relative to bracket 400. Consequently, due to the engagement of the second plurality of gear teeth 412 of driving gear 408 with gear teeth 416 of actuator gear 414, rotational motion (e.g., counterclockwise in FIG. 5) of driving gear 408 relative to bracket 400 may cause rotational motion (e.g., clockwise in FIG. 5) of actuator gear 414 relative to bracket 400.

As actuator gear 414 rotates relative to bracket 400, a surface 502 or other feature of actuator gear 414 may engage with engagement feature 202 of information handling resource 102, causing, during such rotation of actuator gear 414, a force upon engagement feature 202 which may cause engagement feature 202 to move linearly from position C to position D relative to bracket 400, in turn causing corresponding motion of information handling resource 102 which may cause mating of electrical connectors of information handling resource 102 with corresponding electrical connectors within chassis 100. Thus, gear train side latching mechanism 308 may transmit mechanical energy applied by a user to handle 404 to information handling resource 102, providing a mechanical advantage to mate electrical connectors of information handling resource 102 with corresponding electrical connectors within chassis 100.

Once handle 404 is moved to position B, latch 420 may engage with corresponding features of handle 404 to latch handle 404 in the closed position, position B. In such closed position, latch 420 may apply a mechanical force between latch 420 and handle 404 that overcomes the spring force of torsion spring 418 in order to maintain handle 404 in the closed position.

Figure 6A:
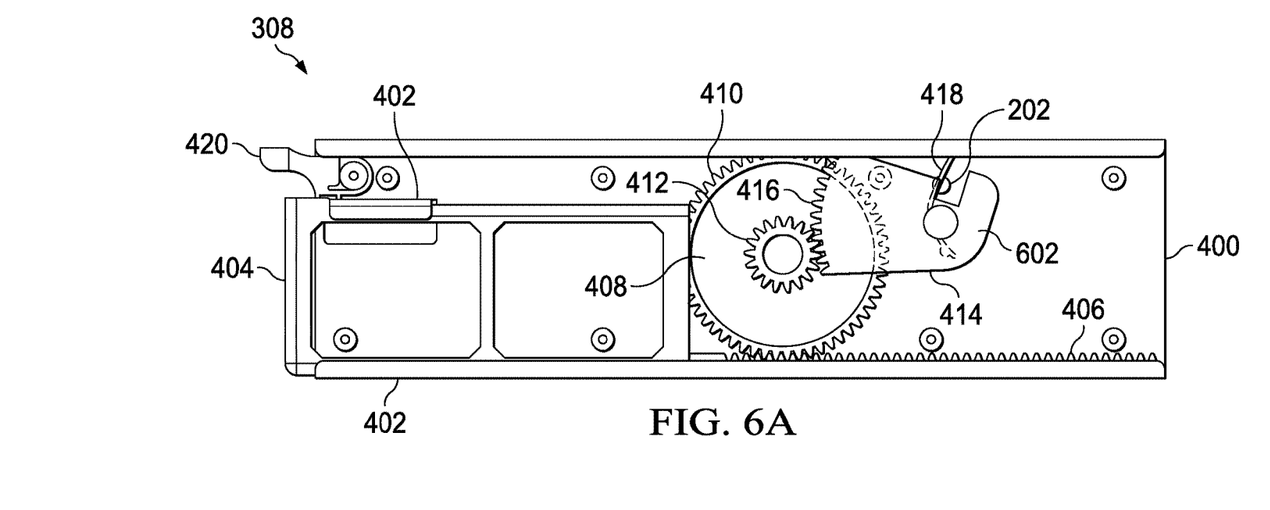
FIGS. 6A-6C (which may be collectively referred to herein as FIG. 6) illustrate a side elevation view of the example gear train side latching mechanism demonstrating functionality of the example gear train side latching mechanism for removal of an information handling resource from a chassis bay, in accordance with embodiments of the present disclosure.
Figure 6B:
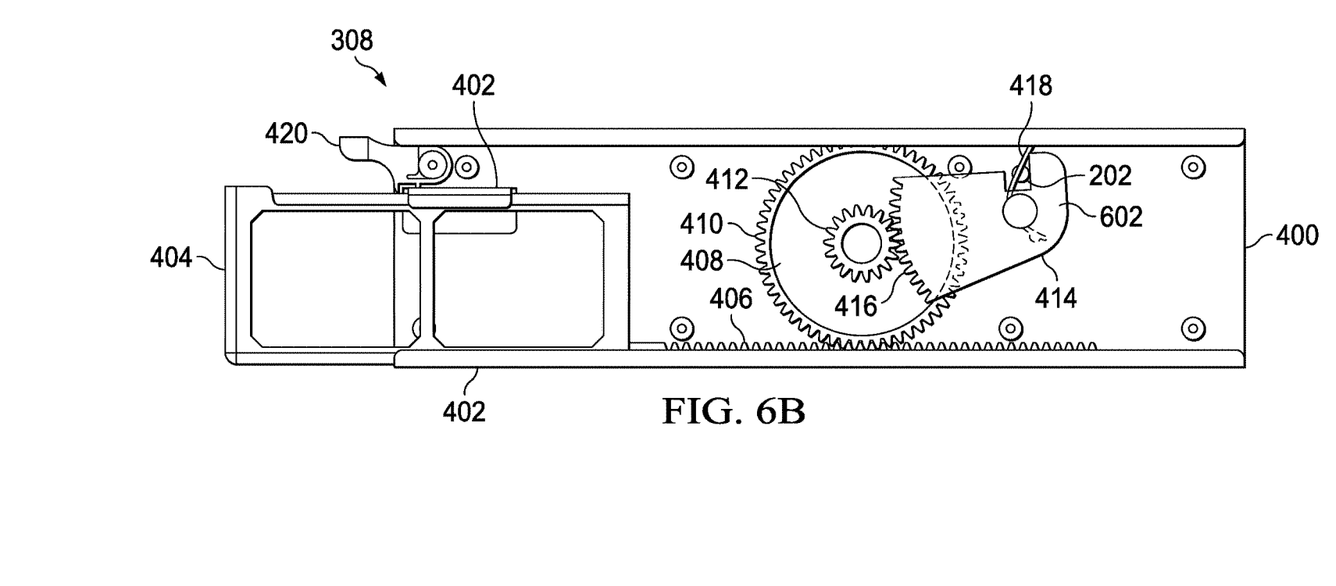
Figure 6C:
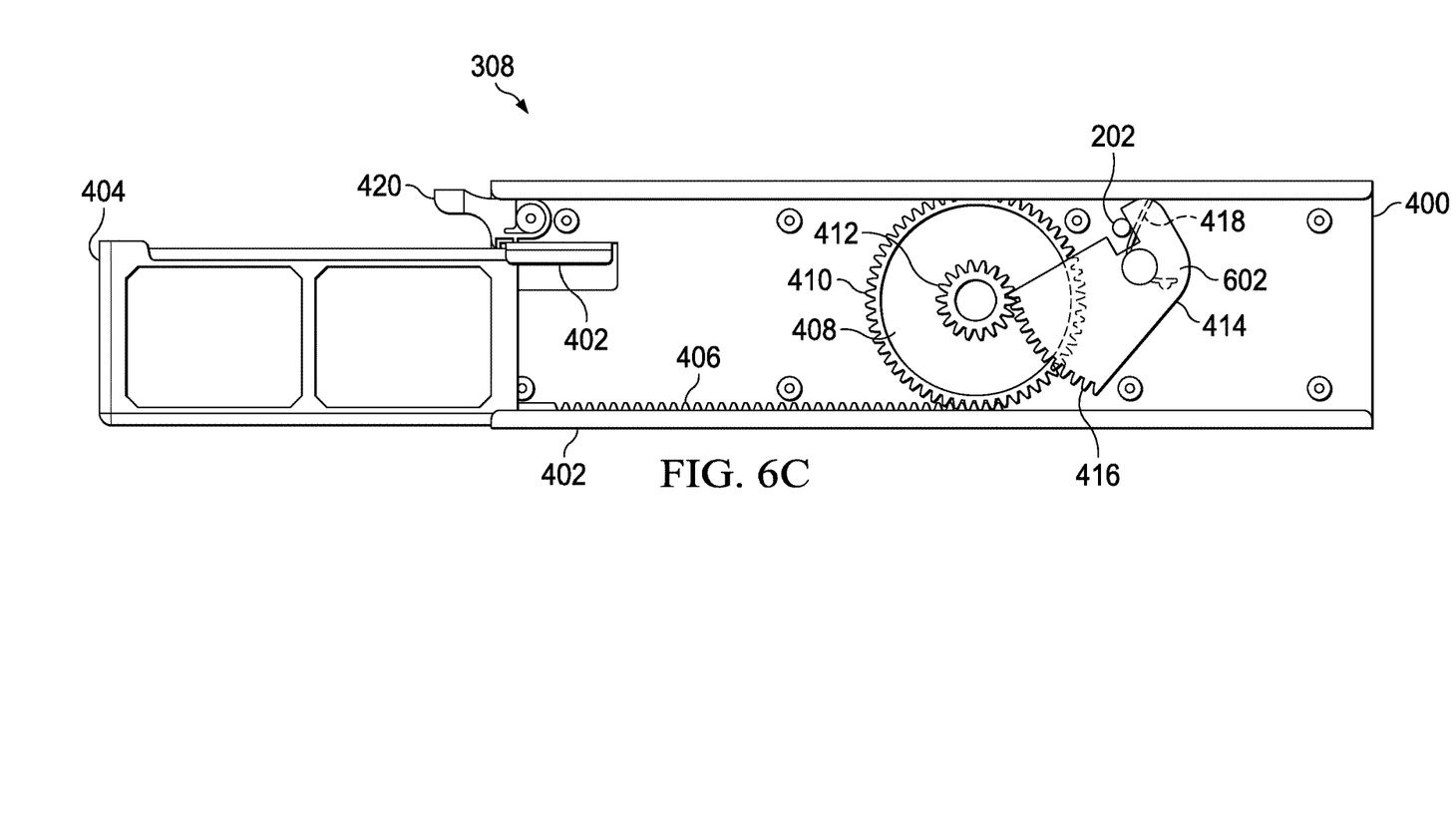

FIGS. 6A-6C illustrate a side elevation view of example gear train side latching mechanism 308 demonstrating functionality of example gear train side latching mechanism 308 during removal of an information handling resource 102 from a chassis bay 200 comprising gear train side latching mechanism 308, in accordance with embodiments of the present disclosure.

To enable such removal of information handling resource 102 from chassis bay 200, a user may engage with latch 420 to release latch 420 from its mechanical coupling with handle 404 when gear train side latching mechanism 308 is in its closed position, as shown in FIG. 6A. After latch 420 is released, the spring force of torsion spring 418 may cause rotation (e.g., counterclockwise in FIG. 6) of actuator gear 414 relative to bracket 400 such that a surface 602 or other feature of actuator gear 414 may engage with engagement feature 202 of information handling resource 102, overcoming the mating force between electrical connectors of information handling resource 102 and corresponding connectors within chassis 100, and causing at least a partial ejection of information handling resource 102 from chassis bay 200, as shown in FIG. 6B. Such rotation of actuator gear 414 relative to bracket 400 may also transmit mechanical energy to handle 404 through driving gear 408 and rack 406 causing at least a partial ejection of handle 404, thus allowing a user to interact with handle 404 (e.g., allowing the user to pull handle 404 in a linear direction relative to bracket 400 further to the left of FIG. 6). Such mechanical energy applied by the user to handle 404 may be transmitted to actuator gear 414 via rack 406 and driving gear 408, such that actuator gear 414 further rotates relative to bracket 400, which may cause surface 602 to act upon engagement feature 202 of information handling resource 102, further ejecting information handling resource 102 from chassis bay 200 to a position, such as that shown in FIG. 6C, that may allow the user to remove information handling resource 102 by directly handling information handling resource 102.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A gear train side latching mechanism, comprising:
a bracket having one or more guiding features;
a handle mechanically coupled to the bracket via the one or more guiding features such that the handle is linearly movable with respect to the bracket;
a rack mechanically coupled to the handle comprising a first plurality of gear teeth and configured to move linearly relative to the bracket in a fixed relation to the handle;
a driving gear rotatably coupled to the bracket and comprising a compound circular spur gear having a second plurality of gear teeth on an outer diameter of the driving gear and a third plurality of gear teeth on an inner diameter of the driving gear, wherein the second plurality of gear teeth are mechanically coupled to the first plurality of gear teeth; and
an actuator gear rotatably coupled to the bracket and comprising a fourth plurality of gear teeth mechanically coupled to the third plurality of gear teeth and further comprising one or more features configured to engage with a corresponding engagement feature of a mechanical member;

wherein the gear train side latching mechanism is arranged such that linear motion of the handle relative to the bracket transmits mechanical energy to the actuator gear via the rack and the driving gear to cause the actuator gear to mechanically interact with the engagement feature to transmit mechanical energy to the engagement feature.

2. The gear train side latching mechanism of claim 1, wherein the mechanical member is an information handling resource of an information handling system comprising the gear train side latching mechanism, and the gear train side latching mechanism is further arranged such that linear motion of the handle relative to the bracket transmits sufficient mechanical energy to enable electrical connectors of the mechanical member to mate with corresponding electrical connectors of the information handling system.

3. The gear train side latching mechanism of claim 2, wherein the mechanical member is a data storage resource.

4. The gear train side latching mechanism of claim 1, further comprising a spring mechanically coupled between the actuator gear and the bracket and having a spring force configured to bias the actuator gear in a particular rotational position relative to the bracket.

5. The gear train side latching mechanism of claim 4, wherein the mechanical member is an information handling resource of an information handling system comprising the gear train side latching mechanism, and the gear train side latching mechanism is further arranged such that the spring force is able to transmit sufficient mechanical energy to overcome a mating force of electrical connectors of the mechanical member to corresponding electrical connectors of the information handling system.

6. An information handling system comprising:
a chassis comprising a bay for receiving a mechanical member; and
a gear train side latching mechanism mechanically coupled to a wall of the bay and comprising:
a bracket having one or more guiding features;
a handle mechanically coupled to the bracket via the one or more guiding features such that the handle is linearly movable with respect to the bracket;
a rack mechanically coupled to the handle comprising a first plurality of gear teeth and configured to move linearly relative to the bracket in a fixed relation to the handle;
a driving gear rotatably coupled to the bracket and comprising a compound circular spur gear having a second plurality of gear teeth on an outer diameter of the driving gear and a third plurality of gear teeth on an inner diameter of the driving gear, wherein the second plurality of gear teeth are mechanically coupled to the first plurality of gear teeth; and
an actuator gear rotatably coupled to the bracket and comprising a fourth plurality of gear teeth mechanically coupled to the third plurality of gear teeth and further comprising one or more features configured to engage with a corresponding engagement feature of a mechanical member;
wherein the gear train side latching mechanism is arranged such that linear motion of the handle relative to the bracket transmits mechanical energy to the actuator gear via the rack and the driving gear to cause the actuator gear to mechanically interact with the engagement feature to transmit mechanical energy to the engagement feature.

7. The information handling system of claim 6, wherein the mechanical member is an information handling resource of the information handling system, and the gear train side latching mechanism is further arranged such that linear motion of the handle relative to the bracket transmits sufficient mechanical energy to enable electrical connectors of the mechanical member to mate with corresponding electrical connectors of the information handling system.

8. The information handling system of claim 7, wherein the mechanical member is a data storage resource.

9. The information handling system of claim 6, further comprising a spring mechanically coupled between the actuator gear and the bracket and having a spring force configured to bias the actuator gear in a particular rotational position relative to the bracket.

10. The information handling system of claim 9, wherein the mechanical member is an information handling resource of the information handling system, and the gear train side latching mechanism is further arranged such that the spring force is able to transmit sufficient mechanical energy to overcome a mating force of electrical connectors of the mechanical member to corresponding electrical connectors of the information handling system.

11. A chassis bay for receiving a mechanical member comprising:
a plurality of walls; and
a gear train side latching mechanism mechanically coupled to a wall of the plurality of walls and comprising:
a bracket having one or more guiding features;
a handle mechanically coupled to the bracket via the one or more guiding features such that the handle is linearly movable with respect to the bracket;
a rack mechanically coupled to the handle comprising a first plurality of gear teeth and configured to move linearly relative to the bracket in a fixed relation to the handle;
a driving gear rotatably coupled to the bracket and comprising a compound circular spur gear having a second plurality of gear teeth on an outer diameter of the driving gear and a third plurality of gear teeth on an inner diameter of the driving gear, wherein the second plurality of gear teeth are mechanically coupled to the first plurality of gear teeth; and
an actuator gear rotatably coupled to the bracket and comprising a fourth plurality of gear teeth mechanically coupled to the third plurality of gear teeth and further comprising one or more features configured to engage with a corresponding engagement feature of a mechanical member;
wherein the gear train side latching mechanism is arranged such that linear motion of the handle relative to the bracket transmits mechanical energy to the actuator gear via the rack and the driving gear to cause the actuator gear to mechanically interact with the engagement feature to transmit mechanical energy to the engagement feature.

12. The chassis bay of claim 11, wherein the mechanical member is an information handling resource of an information handling system comprising the gear train side latching mechanism, and the gear train side latching mechanism is further arranged such that linear motion of the handle relative to the bracket transmits sufficient mechanical energy to enable electrical connectors of the mechanical member to mate with corresponding electrical connectors of the information handling system.

13. The chassis bay of claim 12, wherein the mechanical member is a data storage resource.

14. The chassis bay of claim 11, further comprising a spring mechanically coupled between the actuator gear and the bracket and having a spring force configured to bias the actuator gear in a particular rotational position relative to the bracket.

15. The chassis bay of claim 14, wherein the mechanical member is an information handling resource of an information handling system comprising the gear train side latching mechanism, and the gear train side latching mechanism is further arranged such that the spring force is able to transmit sufficient mechanical energy to overcome a mating force of electrical connectors of the mechanical member to corresponding electrical connectors of the information handling system.

\* \* \* \* \*